US010949995B2

(12) United States Patent
Gao

(10) Patent No.: US 10,949,995 B2
(45) Date of Patent: Mar. 16, 2021

(54) IMAGE CAPTURE DIRECTION RECOGNITION METHOD AND SERVER, SURVEILLANCE METHOD AND SYSTEM AND IMAGE CAPTURE DEVICE

(71) Applicant: Alibaba Group Holding Limited, Grand Cayman (KY)

(72) Inventor: Qianghua Gao, Hangzhou (CN)

(73) Assignee: Alibaba Group Holding Limited

( * ) Notice: Subject to any disclaimer, the term of this patent is extended or adjusted under 35 U.S.C. 154(b) by 158 days.

(21) Appl. No.: 15/985,557

(22) Filed: May 21, 2018

(65) Prior Publication Data
US 2018/0336700 A1 Nov. 22, 2018

(30) Foreign Application Priority Data
May 22, 2017 (CN) .......................... 201710363925.6

(51) Int. Cl.
*G06T 7/73* (2017.01)
*G06K 9/62* (2006.01)
(Continued)

(52) U.S. Cl.
CPC .............. *G06T 7/74* (2017.01); *G06K 9/6215* (2013.01); *G06T 7/337* (2017.01); *G06T 7/97* (2017.01); *H04N 5/23261* (2013.01)

(58) Field of Classification Search
CPC .. G06K 9/6215; G06K 9/6214; G06K 9/6212; G06K 2009/6213; H04N 5/23261; H04N 5/23251
(Continued)

(56) References Cited

U.S. PATENT DOCUMENTS 6,687,386 B1 * 2/2004 Ito ...................... G06K 9/00785
382/103
2003/0110181 A1 6/2003 Schuetze et al.
(Continued)

FOREIGN PATENT DOCUMENTS

CN 1024437 A2 8/2000
CN 104272344 A 1/2015
(Continued)

OTHER PUBLICATIONS

Mahendran, et al., "Visualizing deep convolutional neural networks using natural pre-mages", University of Oxford, Apr. 2016, retrieved from the internet at URL:https://arxiv.org/pdf/1512.02017.pdf on Jul. 20, 2018.
(Continued)

*Primary Examiner* — Nirav G Patel
*Assistant Examiner* — Stephen M Brinch
(74) *Attorney, Agent, or Firm* — Lee & Hayes, P.C.

(57) ABSTRACT

Example embodiments of the present disclosure provide a method and a server image capture direction recognition, a method and a system of surveillance, and an image capture device. The recognition method includes: extracting deep features of a target image captured by a camera; based on degree of matchings between deep features of the target image and deep features of a plurality of reference images, determining a matched reference image of the target image; obtaining a coordinate position relationship between the matched reference image and the target image; using the coordinate position relationship and direction information of the matched reference image, calculating the image capture direction of the camera at the time of capturing the target image. Example embodiments of the present disclosure may quickly and accurately recognize an image capture direction
(Continued)

US 10,949,995 B2

Page 2 of a camera, improving processing efficiency of image capture direction recognition.

18 Claims, 7 Drawing Sheets

(51) Int. Cl.
*G06T 7/33* (2017.01)
*G06T 7/00* (2017.01)
*H04N 5/232* (2006.01)

(58) Field of Classification Search
USPC .................. 382/215–221, 209–210, 224
See application file for complete search history.

(56) References Cited

U.S. PATENT DOCUMENTS

| | | |
|---|---|---|
| 2009/0010507 A1 | 1/2009 | Geng |
| 2014/0270344 A1 | 9/2014 | Krishnamoorthi et al. |
| 2015/0229840 A1 | 8/2015 | Sawai et al. |
| 2015/0243036 A1* | 8/2015 | Hoffmann ............ G06K 9/0061 382/103 |
| 2016/0132531 A1* | 5/2016 | Zeng ...................... G06F 16/51 382/209 |
| 2016/0247261 A1 | 8/2016 | Rhodes et al. |
| 2016/0309085 A1 | 10/2016 | Ilic |
| 2016/0347251 A1 | 12/2016 | Shigemura |
| 2017/0070731 A1* | 3/2017 | Darling ................ H04N 17/002 |
| 2017/0083755 A1 | 3/2017 | Tang et al. |
| 2017/0237947 A1 | 8/2017 | Clemen, Jr. et al. |
| 2017/0308999 A1 | 10/2017 | Denny et al. |
| 2018/0336700 A1 | 11/2018 | Gao |

FOREIGN PATENT DOCUMENTS

| | | |
|---|---|---|
| CN | 105513083 A | 4/2016 |
| CN | 106415594 A | 2/2017 |
| CN | 106529497 A | 3/2017 |
| CN | 106529609 A | 3/2017 |

OTHER PUBLICATIONS

PCT Search Report and Written Opinion dated Aug. 9, 2018 for PCT application No. PCT/US2018/033735, 10 pages.
English-language translation of First Office Action dated Apr. 3, 2020, issued by the China Patent Office in counterpart Application No. CN 201710363925, 1 page.
English-language translation of Search Report issued by the China Patent Office dated Mar. 9, 2020, in counterpart Application No. CN 201710363925.6, 1 page.
First Office Action dated Apr. 3, 2020, issued by the China Patent Office in counterpart Application No. CN 201710363925, 6 pages.

* cited by examiner

IMAGE CAPTURE DIRECTION RECOGNITION METHOD AND SERVER, SURVEILLANCE METHOD AND SYSTEM AND IMAGE CAPTURE DEVICE

CROSS REFERENCE TO RELATED PATENT APPLICATIONS

This application claims priority to Chinese Patent Application No. 201710363925.6, filed on May 22, 2017 and entitled "IMAGE CAPTURE DIRECTION RECOGNITION METHOD AND SERVER, SURVEILLANCE METHOD AND SYSTEM, AND IMAGE CAPTURE DEVICE", which is incorporated herein by reference in its entirety.

TECHNICAL FIELD

The present disclosure relates to the field of information processing technologies, and, more particularly, to image capture direction recognition methods and servers, surveillance methods and systems, and image capture devices.

BACKGROUND

Video surveillance equipment is in widespread usage for supervision of public spaces, traffic management, location safety management, outdoor and indoor video recording, and the like. Video surveillance equipment primarily employs image capture devices, such as, closed-circuit cameras, dome cameras, mobile image capture devices, and the like. Due to the variability of image capture directions in the process of a camera capturing images, as well as the influence of time, weather and the like, acquired video images or still images captured at a same fixed point and a same elevation exhibit relatively large differences. Therefore, when using cameras to acquire video or still images for surveillance processing of security, traffic and the like, often the image capture direction of the camera at the time of capturing video or still images needs to be recognized.

Existing technology generally recognizes the image capture direction of a camera by panorama matching. In particular, through a panoramic camera or a method of stitching a circle of omnidirectionally acquired images, a panoramic image of a setting structure is utilized as a reference image, and panorama matching is performed on a video target image, and from the panoramic image of the setting structure an area corresponding to the target image is found, thus determining a coordinate position relationship between the target image and the panoramic image of the setting structure. Through the coordinate position relationship and the panoramic image of the setting structure the corresponding image capture direction at the time of the camera capturing the target image is calculated.

However, by the above-mentioned existing technology, panoramic images obtained through panoramic cameras or stitching a circle of omnidirectionally acquired images lack robustness, have high dimensionality of features, and exhibit low success rate in accurately matching the corresponding area in the process of target image matching. Furthermore, due to the variability of image capture directions, and the influence of time, weather and the like, the existing method needs to collect a large number of panoramic samples for matching, thus greatly increasing the workload and reducing the processing efficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Example embodiments of the present disclosure provide a method and a server of image capture recognition, a method and a system of surveillance, and an image capture device, which may quickly and accurately recognize an image capture direction of a camera, improving processing efficiency of image capture direction recognition.

To solve the above technical problem, example embodiments of the present disclosure are implemented as follows.

An image capture direction recognition method, including:

extracting deep features of a target image captured by a camera;

determining, based on respective degrees of matching between the deep features of the target image and deep features of a plurality of reference images, a reference image matching the target image;

obtaining a coordinate position relationship between the matched reference image and the target image;

calculating, using the coordinate position relationship and direction information of the matched reference image, an image capture direction of the camera at the time of capturing the target image.

An image capture direction recognition server, including a processor and a memory, the memory storing computer program instructions executable by the processor to:

extract deep features of a target image captured by a camera;

determine a reference image matching the target image based on degrees of matching between deep features of the target image and deep features of a plurality of reference images;

obtain a coordinate position relationship between the matched reference image and the target image;

calculate the image capture direction of the camera at the time of capturing the target image using the coordinate position relationship and direction information of the matched reference image.

An image capture direction recognition device, including:

a deep feature extraction module operable to extract deep features of a target image captured by a camera;

a reference image determination module operable to determine a reference image matching the target image, based on degrees of matching between deep features of the target image and deep features of a plurality of reference images;

a coordinate position relationship acquisition module operable to obtain a coordinate position relationship between the matched reference image and the target image;

an image capture direction computation module operable to calculate an image capture direction of the camera at the time of capturing the target image, using the coordinate position relationship and direction information of the matched reference image.

A surveillance method, including:

acquiring a target image; and sending the target image to a recognition server to cause the recognition server to, based on an above-mentioned method, recognize an image capture direction of a camera at the time of capturing the target image; and to cause the recognition server to perform surveillance processing on an area corresponding to the target image based on the image capture direction.

A surveillance system, comprising:

an acquisition unit operable to acquire a target image and to send the target image to a recognition server;

a recognition server operable according to an above-mentioned method to recognize an image capture direction of a camera at the time of capturing the target image, and operable to perform surveillance processing on an area corresponding to the target image using the image capture direction.

A surveillance system, comprising:

an acquisition unit operable to acquire a target image and to send the target image to a recognition server;

a recognition server operable according to an above-mentioned method to recognize an image capture direction of a camera at the time of capturing the target image, and operable to send the image capture direction to a surveillance server;

a surveillance server operable to perform surveillance processing on an area corresponding to the target image using the image capture direction of the recognition server.

An image capture device, comprising:

a lens operable to capture a target image;

a processor connected to the lens operable to determine a direction of the lens at the time of capturing the target image according to an above-mentioned method.

A computer-readable medium, the computer-readable medium storing a computer program that, when executed by a processor, implements a procedure of an above-mentioned method.

As shown from the technical solutions provided in the example embodiments of the present disclosure, the example embodiments of the present disclosure, through extracting deep features of images, result in the stability and low-dimensionality of image features, and through degrees of matching between deep features of images select reference objects effective to calculate the image capture direction of an image, improve degrees of matching between subsequently obtained reference objects and a target image whose image capture direction is to be recognized. Moreover, through predetermining a plurality of reference images having corresponding direction and/or time features, when subsequently recognizing an image capture direction of a camera, some number of deep features may be adaptively extracted from images having time and/or direction features, so that when different directions, times, weathers and the like in the process of image capture causes relatively large differences between images, calculation of a coordinate position relationship between the target image and the corresponding matching reference image is performed accurately. Compared to existing techniques, techniques as disclosed herein may rapidly and accurately recognize the image capture direction of a camera, improving processing efficiency in image capture direction recognition.

BRIEF DESCRIPTION OF THE DRAWINGS

To describe the technical solutions in the example embodiments of the present disclosure more clearly, the following briefly introduces the accompanying drawings describing the example embodiments. It will be apparent that the accompanying drawings described in the following merely represent some example embodiments described in the present disclosure, and those of ordinary skill in the art may still derive other drawings from these accompanying drawings without creative efforts.

DETAILED DESCRIPTION

Figure 1:
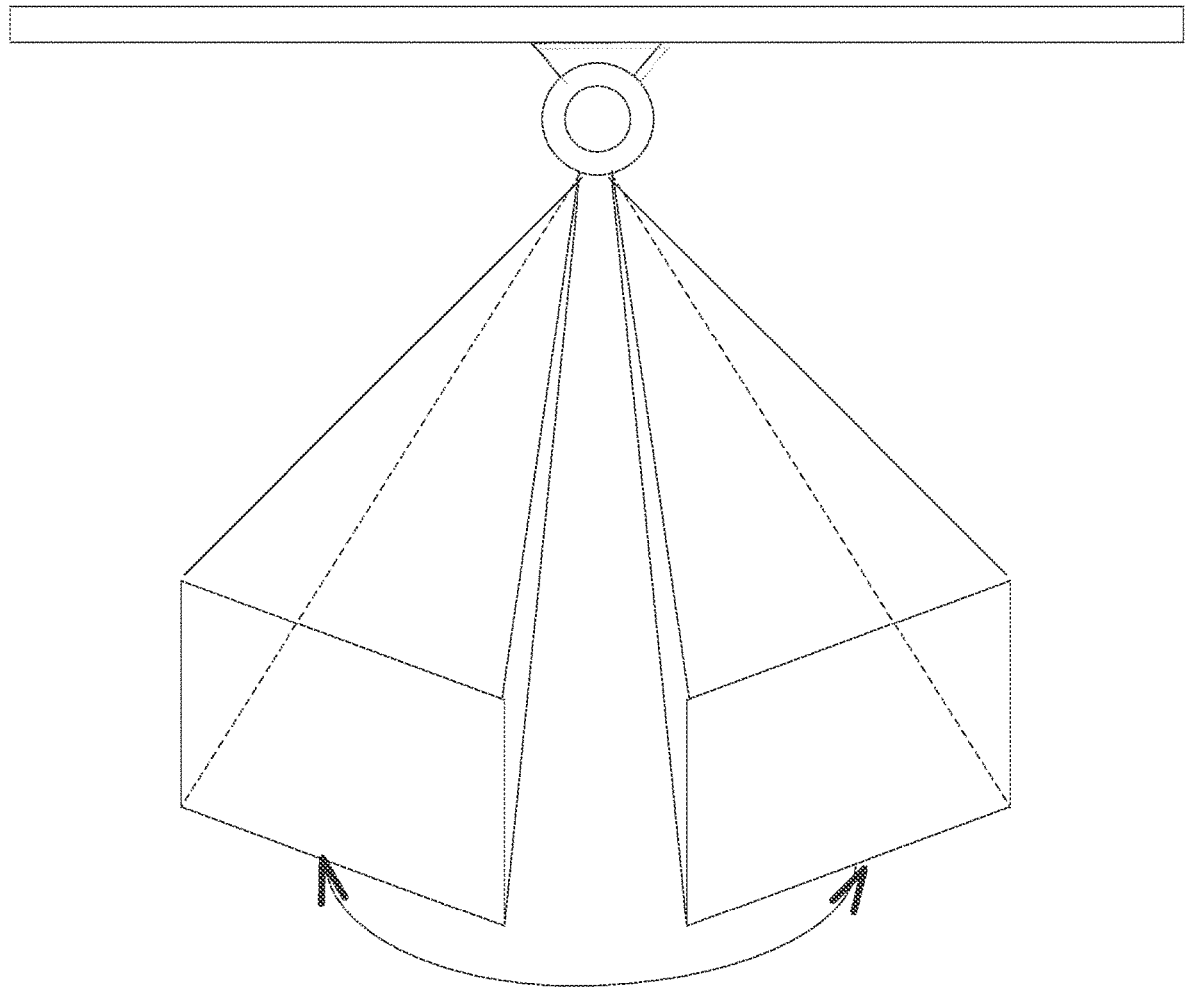
FIG. 1 is a diagram illustrating a same camera in a same location capturing images in different directions in accordance with an example embodiment provided by the present disclosure.

Example embodiments of the present disclosure provide an image capture direction recognition method and a server thereof, a method and a system of surveillance, and an image capture device.

In order to enable those skilled in the art to better understand the technical solutions in the present disclosure, the technical solutions in the example embodiments of the present disclosure will be described clearly and completely through the accompanying drawings in the example embodiments of the present disclosure. It will be apparent that the described example embodiments represent merely some of example embodiments of the present disclosure, rather than all the example embodiments. Based on the example embodiments of the present disclosure, all other example embodiments derived by those of ordinary skill in the art without any creative effort shall fall within the protection scope of the present disclosure.

Presently, roadways, parks, museums, residential communities, and such public areas often require cameras at a fixed point, by manual operation or automated inspection, to implement traffic or security surveillance. A dome camera is a type of camera integrating a plurality of functionalities such as a color integrated camera, a cradle head, a decoder, and a protective housing, providing benefits such as ease of installation and automated turning during operation, thus obtaining widespread usage in the field of surveillance. In practice, a camera such as a dome camera at a same fixed point location, while performing video or still image acquisition over a covered region, will often acquire video images at different times, in different directions. According to example embodiments of the present disclosure, considering that in video acquired at a same fixed point location significant differences exist between video images (each video image may be regarded as an image corresponding to an individual video frame extracted from the video) due to the influence of direction and time, thus, among historical sample images acquired from a camera, feature images selected according to time and/or direction may then undergo image grouping.

According to an example embodiment of the present disclosure, selecting feature images according to time and direction may, for example, select the following groups of images: eastward daytime images, eastward nighttime images, southward daytime images, southward nighttime images, westward daytime images, westward nighttime images, northward daytime images, northward nighttime images, southeastward daytime images, southeastward nighttime images, northeastward daytime images, northeastward nighttime images, southwestward daytime images, southwestward nighttime images, northwestward daytime images, northwestward nighttime images. In particular, daytime and nighttime herein may combine actual seasonal and weather conditions of the captured video in setting time points; for example, in summer with sunny weather, since day breaks relatively early each day and night falls relatively late, daytime hours being comparatively longer may be set as 5:30-18:00 (such hours inclusive of 5:30 but exclusive of 18:00), and nighttime hours being comparatively shorter may be set as 18:00-5:30 (such hours inclusive of 18:00 of a first day but exclusive of 5:30 of a second day). Likewise, in winter with rainy weather, daytime hours may be set as comparatively shorter, and nighttime hours may be set as comparatively longer.

The example herein of selecting feature images according to a combination of time and direction is only one example, and example embodiments of the present disclosure may combine time and direction features of images from practical applications to select other times and/or directions, and examples of embodiments of the present disclosure shall not be limited to the above. Furthermore, after selecting feature images having time and/or direction features, deep features of the feature images may be designated as cluster centers, and cluster analysis may be performed on deep features of historical sample images to determine a plurality of reference images having time and/or direction features.

The following introduces steps of determining a plurality of reference images having direction and/or time features:

1) From historical sample images, select a plurality of feature images having direction and/or time features.

2) Designating respective deep features of the plurality of feature images as cluster centers, performing cluster analysis on deep features of the historical sample images, and assigning the historical sample images to a plurality of clusters corresponding to the cluster centers.

In particular, example embodiments of the present disclosure through cluster analysis methods perform clustering upon large acquired quantities of historical sample images according to direction and/or time features, resulting in images all having similar direction and/or time features in each cluster.

3) From each cluster determining an image as a reference image having corresponding direction and/or time features.

According to an example embodiment of the present disclosure, from each cluster determining an image as a reference image having corresponding direction and/or time features may include:

Performing respective mean calculations on deep features of images of each cluster, designating the calculated mean as a new cluster center;

Based on a plurality of new cluster centers performing iterative cluster analysis on the deep features of the historical sample images until reaching a preset convergence condition, designating the images corresponding to the cluster centers upon reaching the preset convergence condition as reference images;

In particular, the preset convergence condition may include the degree of difference between deep features of historical sample images of each cluster and the corresponding cluster center of that cluster being less than or equal to a preset degree of difference value.

Moreover, during the cluster analysis process, through iterative cluster analysis, patterns in manually operated image capture directions may be extracted.

According to another example embodiment of the present disclosure, from each cluster determining an image as a reference image having corresponding direction and/or time features may include:

Calculating respective degrees of difference between deep features of images of each cluster;

Selecting from each cluster the image having a smallest sum of degrees of difference from deep features of other images of the same cluster as a reference image.

Additionally, in some scenarios, degrees of difference according to example embodiments of the present disclosure may not be numerical values, but rather written representations of particular degrees or trends; in such scenarios, the contents of written representations may be quantified as designated values through applying preset rules. Subsequently the quantified value may be used to determine the difference between two images. By way of example, the value for some particular dimension may be "middle," and accordingly this written symbol may be quantified as a binary value or a hexadecimal value in ASCII encoding.

The above steps of determining a plurality of reference images illustrate that, in example embodiments of the present disclosure, through cluster analysis methods, large acquired quantities of historical sample images are grouped according to direction and/or time features such that a determined reference image from each cluster has corresponding direction and/or time features, so that when subsequently recognizing an image capture direction of a camera, some number of deep features may be adaptively extracted from reference images having time and/or direction features, so that in response to various directions, times, and weather, a reference image having high degrees of matching to an image to be recognized may be determined for performing determination of image capture direction, thus improving the accuracy of determining an image capture direction, while also improving the efficiency of image capture direction recognition.

In particular, deep features are a type of self-learning feature; in contrast to shallow features (points, edges, surfaces, colors, and the like) that are used for capturing local information, deep features, in particular, are complex shapes composed of shallow features such as points, edges, and surfaces, resulting in stability and low-dimensionality of image features, thus better reflecting semantic information. Thus, example embodiments of the present disclosure, through performing cluster analysis on deep features of images, may improve the robustness and stability of reference images. In particular, according to example embodiments of the present disclosure, depth features of images may be extracted using deep learning methods, and in particular, deep learning techniques may include convolutional neural networks, conventional neural networks, recurrent neural networks, deep belief networks, and the like, example embodiments of the present invention not to be limited to the above. According to a particular example embodiment, taking the example of a convolutional neural network, extracting deep features of images through deep learning methods may in particular include the following steps:

Acquiring large quantities of images of similar settings, that is, images acquired at a same location in different directions and/or times;

Training the convolutional neural network using the large acquired quantities of images to obtain a deep network model;

Using the new deep network model to extract deep features of still images.

According to another example embodiment, taking the example of a convolutional neural network, extracting deep features of images through deep learning methods may in particular include the following steps:

Acquiring large quantities of images of similar settings, that is, images acquired at a same location in different directions and/or times;

Using the large acquired quantities of images, performing network fine-tuning on a pretrained network, that is, training an existing neural network model using the acquired images, modifying the output clusters of the last layer of the existing convolutional network, and then obtaining a new deep network model from the training;

Using the new deep network model to extract deep features of images.

Following the above disclosure of determining a plurality of reference images having direction and/or time features, based on the plurality of reference images having direction and/or time features determined as above, an example embodiment of the present disclosure providing an implementation of an image capture direction recognition method is illustrated below.

First, deep features of a target image captured by a camera may be extracted.

In particular, steps of a particular method of extracting deep features of a target image captured by a camera may combine the above-mentioned steps of extracting deep features of images through deep learning, which shall not be repeated here.

In particular, according to example embodiments of the present disclosure target images may include still images captured by a camera or video frame images extracted from a video.

Next, based on degrees of matching between the deep features of the target image and the deep features of the plurality of reference images, a matched reference image may be determined for the target image.

In particular, according to example embodiments of the present disclosure, through calculating respective degrees of matching between the deep features of the target image and of the plurality of reference images, the reference image corresponding to deep features having the greatest degree of matching may be taken as the reference image matching the target image, and furthermore, this reference image may be taken as the reference image for determining the image capture direction of the camera at the time of capturing the target image.

In particular, for example, if the degrees of matching between deep features of the target image and deep features of the plurality of reference images are regarded as "distance" in one-dimensional space, the deep features of all images are regarded as a plurality of points of a "community," the deep features of the target image are regarded as the center of the "community," and the deep features of the plurality of reference images are regarded as other points of the "community"; the closer a point lies to the center of the "community," the smaller the difference between the deep features of the reference image corresponding to that point of the "community" and the deep features of the target image, and the better the degree of matching between the deep features of the reference image corresponding to the point of the "community" and the deep features of the target image.

According to an example embodiment of the present disclosure, a degree of matching between deep features of two images may be the Euclidean distance between deep features of the two images, such that the smaller the numerical value of the Euclidean distance calculated between the deep features of the two images, the better the degree of matching between the two images, and conversely, the greater the numerical value of the Euclidean distance calculated between deep features of the two images, the worse the degree of matching between the two images.

A degree of matching between two images according to example embodiments of the present disclosure is not limited to Euclidean distance as above, but may also include cosine distance, Manhattan distance, and the like, and in certain scenarios, a degree of matching may not be a numerical value, but rather written representations of degrees or trends; in such scenarios, the contents of written representations may be quantified as designated values through applying preset rules. Subsequently the quantified value may be used to determine the degree of matching between two images. By way of example, the value for some particular dimension may be "middle," and accordingly this written symbol may be quantified as a binary value or a hexadecimal value in ASCII encoding. The degree of matching between deep features of two images described in the example embodiments of the present disclosure are not limited to the ones described above.

According to above example embodiments of the present disclosure, through degrees of matching between deep features of images, reference objects effective for calculating image capture directions of images may be selected, which results in stability and low-dimensionality of image features, and which may improve degrees of matching between a matched reference object (that is, a reference image matching an image whose image capture direction is to be recognized) and the image whose image capture direction is to be recognized, which may thus improve accuracy of determining image capture directions.

Next, once the matched reference image of the target image has been determined, the approximate direction of the camera at the time of capturing the target image may be known; for example, supposing that the grouping corresponding to the matched reference image of the target image is southeastward daytime, it may be known that the image capture direction of the camera at the time of capturing the target image was approximately a southeastward direction.

Next, to obtain a precise image capture direction, a coordinate position relationship between the matched reference image and the target image may be obtained.

In practical usage, if object point P in a world coordinate system has a coordinate (X, Y, Z) in three dimensions, a corresponding image point p having pixels as units in an image coordinate system has a coordinate (u, v) in two dimensions. According to example embodiments of the present disclosure, a coordinate position relationship between images may be a coordinate position relationship between two-dimensional image coordinate systems. FIG. 1 is a diagram of a same camera in a same location capturing images in different directions of an example embodiment provided by the present disclosure; as shown in FIG. 1, a coordinate position relationship between two images captured in different directions by a camera in a same location may be expressed through a homography transformation matrix between the two images. In particular, feature points of the two images may be extracted, and then point matching may be performed between the feature points of the two images, corresponding coordinate position relationships between matched point pairs may be calculated, the corresponding coordinate location relationships between matched point pairs may serve as a homography transformation matrix between the two images, and thus a coordinate conversion relationship between the two images may be obtained.

In particular, according to example embodiments of the present disclosure, feature points may include points where greyscale signals exhibit clear changes in two-dimensional directions, such as corners, blobs, intersections, and so on. In particular, extracting feature points from images may utilize a corresponding image feature point extraction algorithm, such as the Moravec algorithm, the Forstner algorithm, or the Harris corner detection algorithm, but algorithms for extracting image feature points according to example embodiments of the present disclosure are not limited to these three algorithms.

Additionally, in practical applications of obtaining a coordinate location relationship between the matched reference image and the target image, during the process of a homography transformation matrix calculation, a number of matching errors may exist between point pairs; thus, the RANSAC (RANdom SAmple Consensus) algorithm may be used to remove erroneously matched point pairs, improving the accuracy of a homography transformation matrix.

Next, a homography transformation matrix obtained from calculating feature points of two images may reflect a coordinate conversion relationship between the two images, that is, the homography transformation matrix may be regarded as a mapping relationship which maps points of an image on a two-dimensional plane to another plane; for a camera at a fixed point, when parameters (internal parameters of a camera including focal length and such parameters relating to the internal structure of the camera) are already known, displacement parameters of the reference center image (that is, the matched reference image) corresponding to the target image may be directly derived through a homography transformation matrix. According to an implementation, the displacement parameters may be a pan displacement $\Delta p$, a tilt displacement $\Delta t$ and a zoom displacement $\Delta z$. Then, once the direction information of the matched reference image is known, that is, after obtaining the pan p, tilt t, and zoom z data of the camera at the time of capturing the matched reference image, the direction data (p, t, z) of the matched reference image may have corresponding displacement parameters ($\Delta p$, $\Delta t$, $\Delta z$) added to it, obtaining direction information of the target image (p+$\Delta p$, t+$\Delta t$, z+$\Delta z$), that is, the pan, tilt and zoom data of the camera at the time of capturing the target image. Next, the pan, tilt, and zoom data of the camera at the time of capturing the target image may be converted to the image capture direction of the camera at the time of capturing the target image in a three-dimensional world coordinate system.

According to an alternate embodiment, although a coordinate conversion relationship between images includes zoom z, after obtaining pan, tilt, and zoom data of the camera at the time of capturing an image, when further obtaining the image capture direction of the camera, zoom z does not impact the image capture direction, and thus, the image capture direction of the camera at the time of capturing the target image determined directly based on the pan and the tilt of the camera at the time of capturing the target image. This way, there is no need to calculate the zoom displacement parameter, reducing the extent of processing.

By way of example, taking as baseline a particular positioning of the camera, during left and right movements of the camera changes in pan p are exhibited, during up and down movements of the camera changes in tilt t are exhibited, and during adjustments of camera focal length changes in zoom z are exhibited. In a setting, suppose that a camera's original image capture direction undergoes displacement from a level due north direction (direction information (p=0, t=0, z)), and a target image is captured. By the above-mentioned method, displacement parameters between the target image and the matched reference image are obtained: $\Delta p$=+45° (here, westward displacements are set as positive, and eastward displacements as negative), $\Delta t$=0 (that is, tilt does not change), and $\Delta z$ is not considered. Correspondingly, information about the direction of the camera at the time of capturing the target image is obtained: (p+$\Delta p$, t+$\Delta t$, z+$\Delta z$) =(p=45°, t=0, z). That is, these displacement parameters change the image capture direction of the camera by a 45° westward displacement from a level due north direction.

Additionally, the above description of an image capture direction obtained by calculations serves as an illustration, and different direction standards selected in practical application, or other calculation methods, may be combined according to example embodiments of the present disclosure; for example, when direction information (p=0, t=0, z) corresponds to a level due south direction, the above-mentioned image capture direction may be a westward 45° displacement from a level due south direction; example embodiments of the present disclosure shall not be limited to the above.

Additionally, image capture directions of example embodiments of the present disclosure may be geographical coordinates directions, or may be relative directions, such as a relative direction from capturing the target image to capturing the matched reference image.

An example embodiment of an image capture direction recognition method according to the present disclosure, through extracting deep features of images, results in the stability and low-dimensionality of image features, and through degrees of matching between deep features of images selects reference objects effective to calculate the image capture direction of an image, improving degrees of matching between the subsequently matched reference object and the target image whose image capture direction is to be recognized. Moreover, through predetermining a plurality of reference images having corresponding direction and/or time features, when subsequently recognizing an image capture direction of a camera, some number of deep features may be adaptively extracted from images having time and/or direction features, so that when different directions, times, weather and the like in the process of image capture causes relatively large differences between images, calculation of a coordinate position relationship between the target image and the corresponding matched reference image is performed accurately. Compared to existing techniques, techniques as disclosed herein may rapidly and accurately recognize the image capture direction of a camera, improving processing efficiency in image capture direction recognition.

Another aspect of the present disclosure provides an image capture direction recognition server, including a processor and a memory, the memory storing computer program instructions executable by the processor, the computer program instructions including:

Extracting deep features of a target image captured by a camera; Based on degrees of matching between deep features of the target image and deep features of a plurality of reference images, determining a matched reference image of the target image;

Obtaining a coordinate position relationship between the matched reference image and the target image;

Using the coordinate position relationship and direction information of the matched reference image, calculating the image capture direction of the camera at the time of capturing the target image.

In particular, obtaining the coordinate position relationship between the matched reference image and the target image using the coordinate location relationship and direction information of the mutually matching reference image according to example embodiments of the present disclosure, the processor may include a central processing unit (CPU) or a graphics processing unit (GPU), and may include other microcontrollers capable of logical processing, such as logic gate circuits, integrated circuits, or other suitable combinations. Memory according to embodiments of the present invention may be a memory device for storing information. In a digital system, a device capable of storing binary numerical data may be memory; in an integrated circuit, a circuit having storage functionality may be memory, such as RAM, FIFO; in a system, storage equipment having tangible form may be memory, and so on. In practice, data storage may be implemented using cloud storage, and implementations shall not be limited by the present disclosure.

Furthermore, the plurality of reference images having direction and/or time features may be determined by the following steps:

From historical sample images, selecting a plurality of feature images having direction and/or time features;

Designating respective deep features of the plurality of feature images as cluster centers, performing cluster analysis on deep features of the historical sample images, and assigning the historical sample images to a plurality of clusters corresponding to the cluster centers;

From each cluster, determining an image as a reference image having corresponding direction and/or time features.

Furthermore, according to the computer program instructions, from each cluster determining an image as a reference image having corresponding direction and/or time features may include:

Performing respective mean calculations on deep features of images of each cluster, using the calculated mean as a new clustering center;

Based on a plurality of new cluster centers performing iterative cluster analysis on the deep features of the historical sample images until reaching a preset convergence condition, designating the images corresponding to the cluster centers upon reaching the preset convergence condition as reference images;

In particular, the preset convergence condition includes the degree of difference between deep features of historical sample images of each cluster and the corresponding cluster center of that cluster being less than or equal to a preset degree of difference value.

Furthermore, according to the computer program instructions, from each cluster determining an image as a reference image having corresponding direction and/or time features may include:

Calculating respective degrees of difference between deep features of images of each cluster;

Selecting from each cluster the image having a smallest sum of degrees of difference from deep features of other images of the same cluster as a reference image.

Furthermore, according to the computer program instructions, based on degrees of matching between the deep features of the target image and the deep features of the previously determined plurality of reference images, determining the reference image matching the target image may include:

Calculating respective degrees of matching between deep features of the target image and of the plurality of reference images;

Designating the reference image corresponding to the deep features with the greatest degree of matching as the reference image matching the target image.

Furthermore, the degree of matching may at least include one of the following:

Euclidean distance, cosine distance, Manhattan distance.

Furthermore, according to the computer program instructions, obtaining a coordinate position relationship between the matched reference image and the target image may include:

Extracting point features of the matched reference image and the target image; Performing point matching between feature points of the matched reference image and feature points of the target image;

Calculating a coordinate position relationship between the matched point pairs, obtaining a homography transformation matrix between the matched reference image and the target image, and designating the conversion relationship of the homography transformation matrix as the coordinate position relationship.

Furthermore, direction information may include:

Pan, tilt, and zoom data of the camera at the time of capturing the target image.

Furthermore, calculating the image capture direction of the camera at the time of capturing the target image includes:

Based on displacement parameters determined from the coordinate position relationship, performing displacement processing on direction information of the matched reference image to obtain the image capture direction.

Furthermore, displacement parameters according to example embodiments of the present disclosure may be increment data corresponding one-to-one to direction information; for example, when direction information includes pan, tilt, and zoom data of the camera at the time of capturing an image, the displacement parameters may include pan increment, tilt increment, and zoom increment data of the camera at the time of capturing an image. Displacement parameters may alternately be increment data not corresponding one-to-one to direction information; for example, when direction information includes pan, tilt, and zoom data of the camera at the time of capturing an image, displacement parameters may include pan increment and tilt increment data of the camera at the time of capturing an image.

Figure 2:
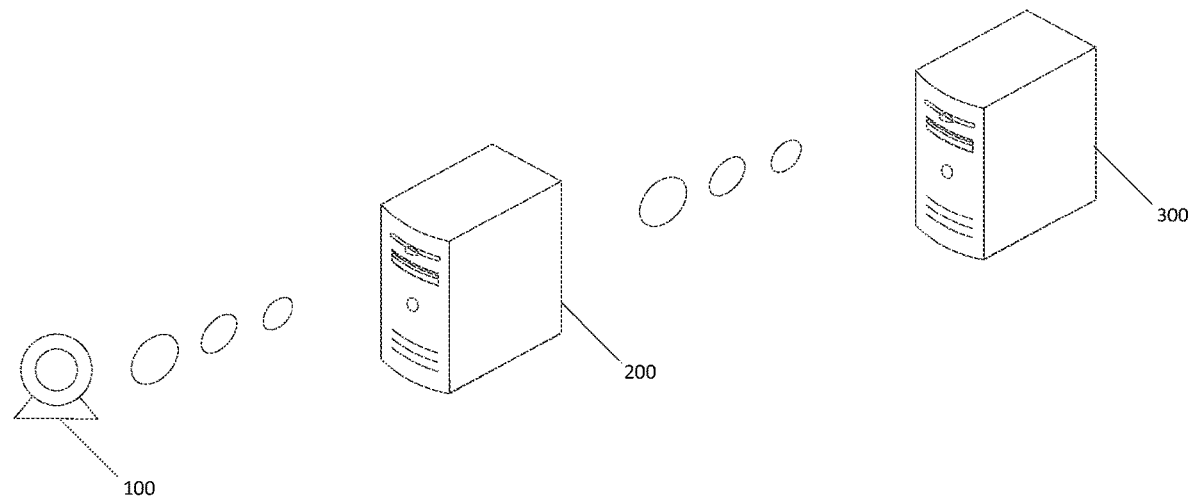
FIG. 2 is a diagram of a surveillance system according to an example embodiment provided by the present disclosure.

Another aspect of the present invention provides example embodiments of a surveillance system. FIG. 2 is a diagram of a surveillance system according to an example embodiment provided by the present disclosure. A surveillance system according to example embodiments of the present disclosure may include an acquisition unit 100, a recognition server 200 and a surveillance server 300, among which:

The acquisition unit 100 may operate to acquire target images; and to send the target images to the recognition server 200.

In particular, the acquisition unit 100 may include devices operable to acquire images and transmit data such as, for example, a dome camera and the like.

The recognition server 200 may operate according to the above-mentioned image capture direction recognition method to recognize the image capture direction of a camera at the time of capturing a target image; and may operate to send the image capture direction to the surveillance server 300.

The surveillance server 300 may operate according to the image capture direction of the recognition server to perform surveillance processing on an area corresponding to the target image.

Moreover, the above-mentioned surveillance server 300 and recognition server 200 in a practical setting may be different servers configured for intercommunication or may be the same server, and example embodiments of the present disclosure shall not be limited to such.

According to an embodiment, the above-mentioned recognition server 200 may recognize an image capture direction by an online real-time method, may recognize an image capture direction by an offline method, or may recognize an image capture direction by a combination of online and offline methods.

In a practical application, a surveillance system according to example embodiments of the present disclosure may be utilized in a city brain, the city brain being a super artificial intelligence, which, through artificial intelligence technology, may implement global real-time analysis over an entire city, automatic deployment of public resources, and repair of bugs in the city operation, and capable of administrating the city. Presently, the first step of a city brain project is total digitization of infrastructure such as traffic, power, water and the like, connecting data resources scattered throughout units of the city, and establishing a "neural network." Using traffic as an example, urban traffic management data, public service data, mobile carrier data and Internet data numbering in the tens of billions are centralized in the city brain system. Once in possession of the data resources, the city brain also needs to perform related data processing, and the city brain system may, based on data such as video data and the like collected from various roadways, perform video recognition processing, may obtain vehicle travel routes over complex road systems, may quickly obtain how many vehicles traveled in which directions on a particular roadway, in conjunction with operational data such as mobile phone maps, vehicle travel speeds and counts recorded by an inductive loop detector, buses, taxis, and the like. Based on such operational data, a city brain may construct an algorithmic model in a simulated digital city, iteratively optimize through machine learning, and calculate what passage time lengths for traffic lights at each intersection maximize efficiency? At which intersections should left turns be forbidden? How should numbers and routing of buses be reasonably scheduled? Do better choices for road construction exist or not? And the like.

Figure 3:
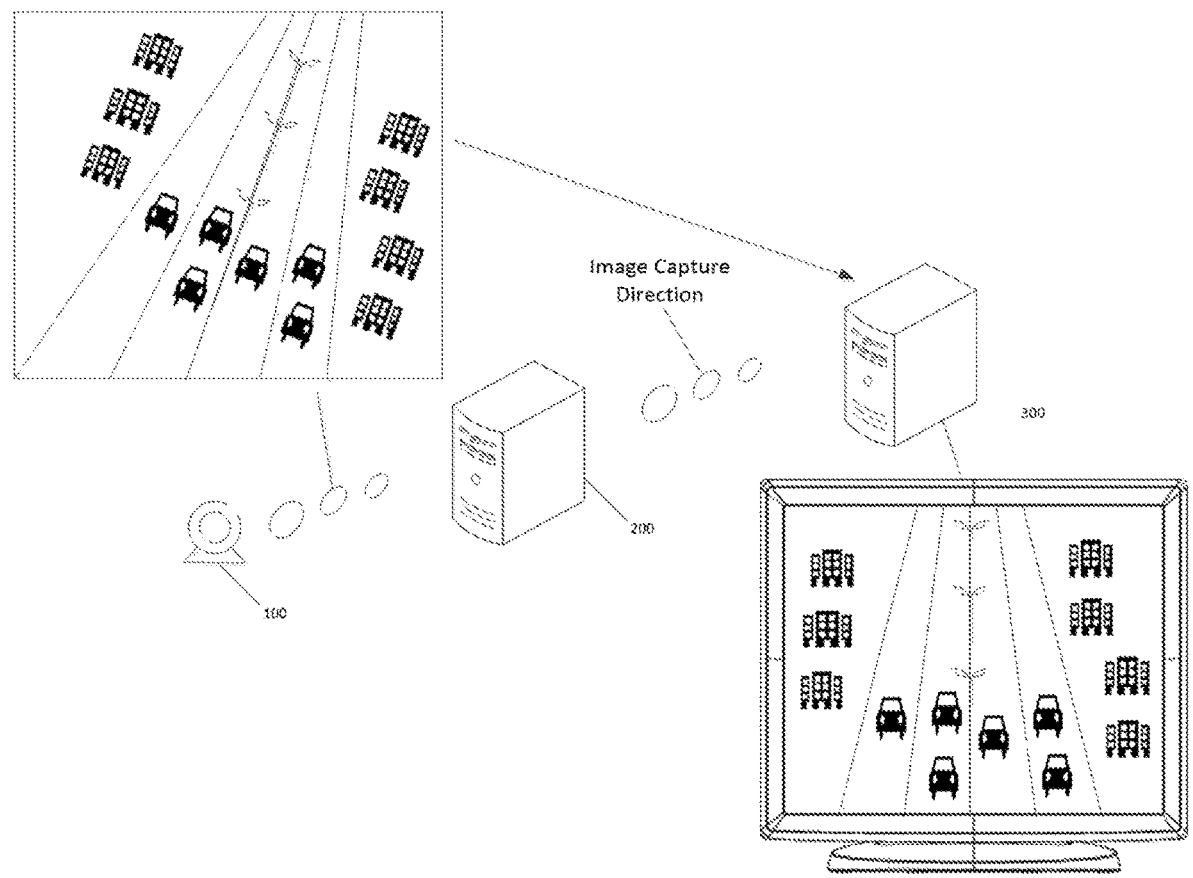
FIG. 3 is a diagram of an embodiment of a traffic surveillance application for a surveillance system provided by example embodiments of the present disclosure.

A particular scenario as below illustrates a surveillance system of the present disclosure. Obtaining the coordinate position relationship between the matched reference image and the target image, in the example of traffic monitoring, illustrates a particular applied setting for a surveillance system provided by example embodiments of the present disclosure. FIG. 3 is a diagram of an embodiment of a traffic surveillance application for a surveillance system provided by example embodiments of the present disclosure.

The acquisition unit 100 may acquire traffic data over a roadway in real time, and may send acquired video frames (frame by frame) including traffic data to the recognition server 200 in real time or according to a preset time; taking the image of FIG. 3 as an example, the acquisition unit 100 sends an image to the recognition server 200.

Next, after the recognition server 200 receives the image, deep features of the image may be extracted, and based on degrees of matching between the deep features of the image and deep features of a predetermined plurality of reference images having direction and/or time features, a matching reference object of the received image is determined; then, based on direction information of the reference object and a coordinate position relationship between the reference object and the received image, the image capture direction of a camera at the time of capturing the image is determined; here, suppose that the image capture direction is 20° northeastward.

Next, the recognition server 200 may send the image capture direction of 20° northeastward to the surveillance server 300, and either the recognition server 200 or the acquisition unit 100 may send the original image to the surveillance server 300, and the surveillance server 300 may, based on the image capture direction, perform surveillance processing on an area corresponding to the image. In particular, this may include, based on the image capture direction, correcting the image to an upright orientation of the roadway (the monitor of FIG. 3 displaying an image after correction by an image capture direction); counting may be performed on operational data of the number of vehicles on the roadway, their respective directions of travel, buses, taxis, and the like; and then, based on the count data, subsequent processing such as roadway management may be implemented.

Figure 4:
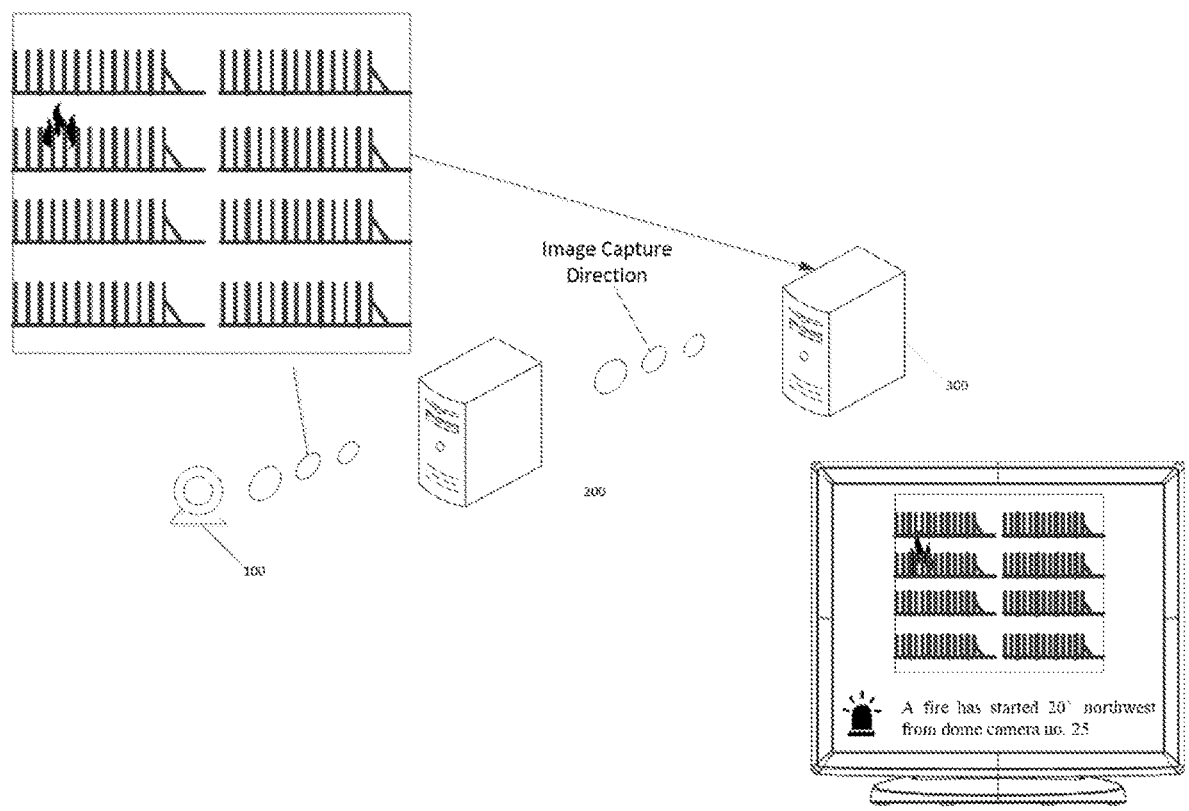
FIG. 4 is a diagram of an embodiment of a library surveillance application for a surveillance system according to example embodiments of the present disclosure.

Another particular scenario as below illustrates a surveillance system of the present disclosure. Taking surveillance of a library as an example, a particular applied setting of a surveillance system according to example embodiments of the present disclosure is disclosed. FIG. 4 is a diagram of an embodiment of a library surveillance application for a surveillance system according to example embodiments of the present disclosure.

An acquisition unit 100 may acquire real-time video data of the library interior, and may send acquired video frames (frame-by-frame) to the recognition server in real time or according to a preset time; taking the image of FIG. 4 as an example, acquisition unit 100 sends the image to recognition server 200.

Next, after the recognition server 200 receives the image, deep features of the image may be extracted, and based on degrees of matching between the deep features of the image and deep features of a predetermined plurality of reference images having direction and/or time features, a matching reference object of the received image is determined; then, based on direction information of the reference object and a coordinate position relationship between the reference object and the received image, the image capture direction of a camera at the time of capturing the image is determined; here, suppose that the image capture direction is 20° northwestward.

Next, the recognition server 200 may send the image capture direction of 20° northwestward to the surveillance server 300, and either the recognition server 200 or the acquisition unit 100 may send the original image to the surveillance server 300, and the surveillance server 300 monitors the appearance of fire in an image frame among image frames captured by a particular camera, and, after receiving from the recognition server 200 an image capture direction corresponding to the image frame where fire appeared, may combine an alarm with guidance information corresponding to the image frame direction output, such as "a fire has started 20° northwest from dome camera no. 25." Thus the timely addressing of accidents occurring within a surveillance range may be implemented, averting the loss of important personnel and property.

Thus, a surveillance system according to example embodiments of the present disclosure, through image acquisition, sends image capture directions from a recognition server, the image capture direction recognition server through deep learning extracting deep features of images, resulting in the stability and low-dimensionality of image features, and, through degrees of matching between deep features of images, selecting reference images effective for calculating an image capture direction of a target image, thus improving a degree of matching between a subsequent matched reference image and a target image whose image capture direction is to be recognized. Therefore, through performing clustering analysis on deep features of historical sample images in advance, a plurality of reference images having direction and/or time features are obtained, so that in subsequent recognition of the image capture direction of a camera, some number of deep features may be adaptively extracted from reference images having time and/or direction features, so that when different directions, times, weather and the like in the process of image capture cause relatively large differences between images, calculation of a coordinate position relationship between the target image and the corresponding matching reference image is performed accurately, and subsequently, the surveillance server combines the surveilled image frame and the image capture direction to perform surveillance processing on the corresponding area, providing data support for a city brain to implement global real-time analysis.

Another aspect of the present disclosure further provides an image capture device, including:

A lens, operative to capture a target image;

A processor, connected to the lens, operative to determine the direction of the lens at the time of capturing the target image according to the above-mentioned recognition method.

Furthermore, in different applications, an image capture device of example embodiments of the present disclosure may be one of the following:

A mobile device;

A security camera;

An aerial surveillance device; or

A mobile ground surveillance device.

In particular, according to applications in various daily life, commonly used mobile devices in daily life such as mobile phones, tablets and the like may be utilized; according to applications in various public space surveillance, surveillance cameras such as dome cameras and the like may be utilized; according to applications in various areas requiring wide range surveillance, aerial surveillance devices such as unmanned aerial vehicles and the like may be utilized; in various surveillance applications, mobile ground surveillance devices such as robots and the like may be utilized.

Additionally, the above-mentioned description of applications of different imaging devices serves as only an example, and any imaging device may also be adapted to other applications.

Figure 5:
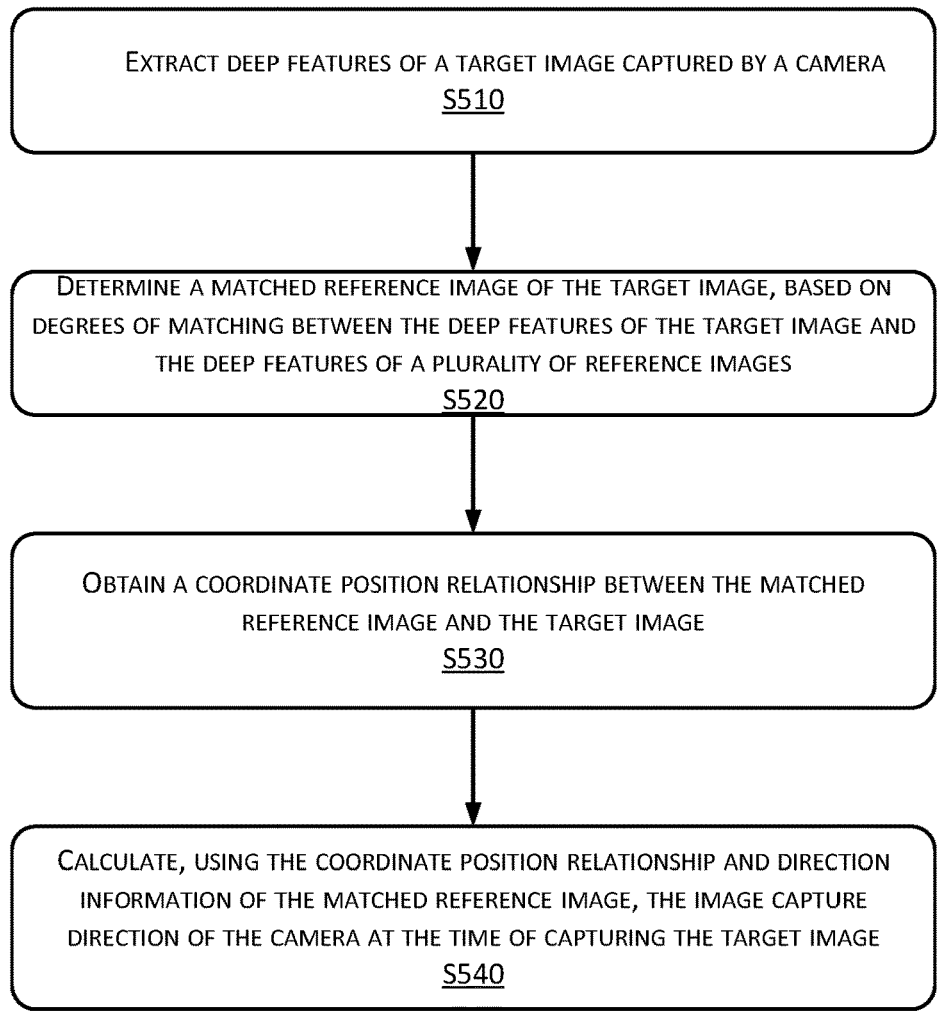
FIG. 5 is a flowchart of an example embodiment of an image capture direction recognition method according to the present disclosure.

FIG. 5 is a flowchart of an example embodiment of an image capture direction recognition method according to the present disclosure; the present disclosure has provided operational steps of a method of the example embodiments or flowchart, but based on conventional or non-inventive work more or fewer steps may be included. The order of steps listed by the example embodiment is only one version among many possible orders of executing these steps, and does not represent a sole order of execution. In executing an actual system or client product, serial execution of the method according to the example embodiment or shown in the figure, or parallel execution (such as by a parallel processor or multithreaded environment), are possible. As shown in FIG. 5, the method may include:

S510: Extract deep features of a target image captured by a camera.

S520: Determine a matched reference image of the target image, based on degrees of matching between the deep features of the target image and the deep features of a plurality of reference images.

S530: Obtain a coordinate position relationship between the matched reference image and the target image.

S540: Using the coordinate position relationship and direction information of the matched reference image, calculate the image capture direction of the camera at the time of capturing the target image.

Figure 6:
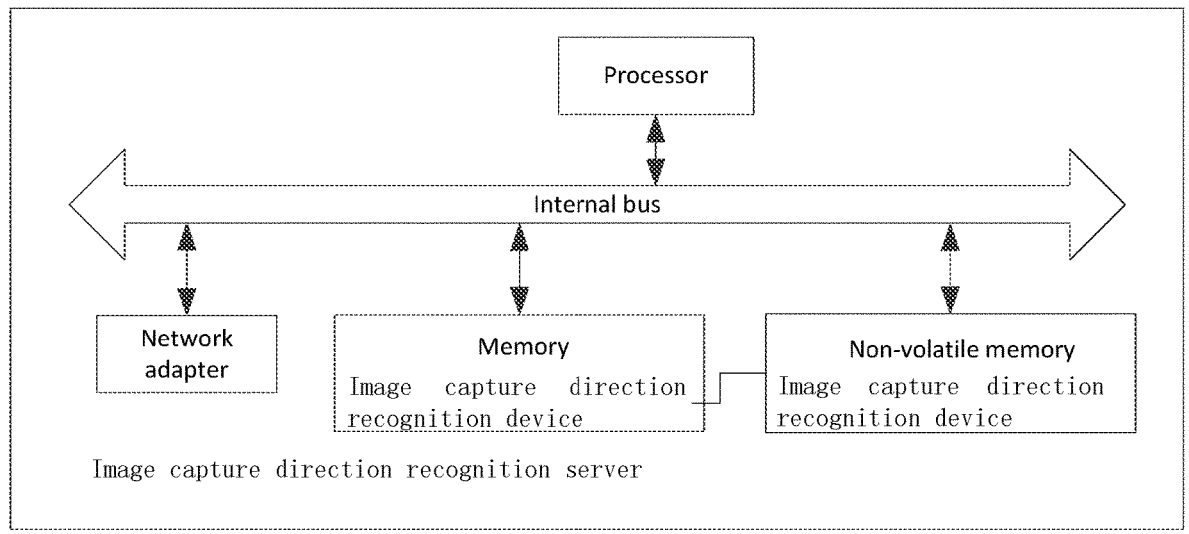
FIG. 6 is a block diagram of an image capture direction recognition server according to an example embodiment of the present disclosure.

FIG. 6 is a block diagram of an image capture direction recognition server according to an example embodiment of the present disclosure. According to FIG. 6, in the hardware layer, the server includes a processor, an internal bus, a network interface, memory, and non-volatile memory, and may further include hardware required for other services. The processor reads a corresponding computer program from nonvolatile memory to memory and then executes it, establishing an image capture direction recognition device at the logical level. In addition to the software implementation, this application does not exclude other implementations, such as logic devices or combinations of hardware and software, and the like, which is to say that the main execution body of the following process handling is not limited to each logical unit, but may also be a hardware or logic device.

Figure 7:
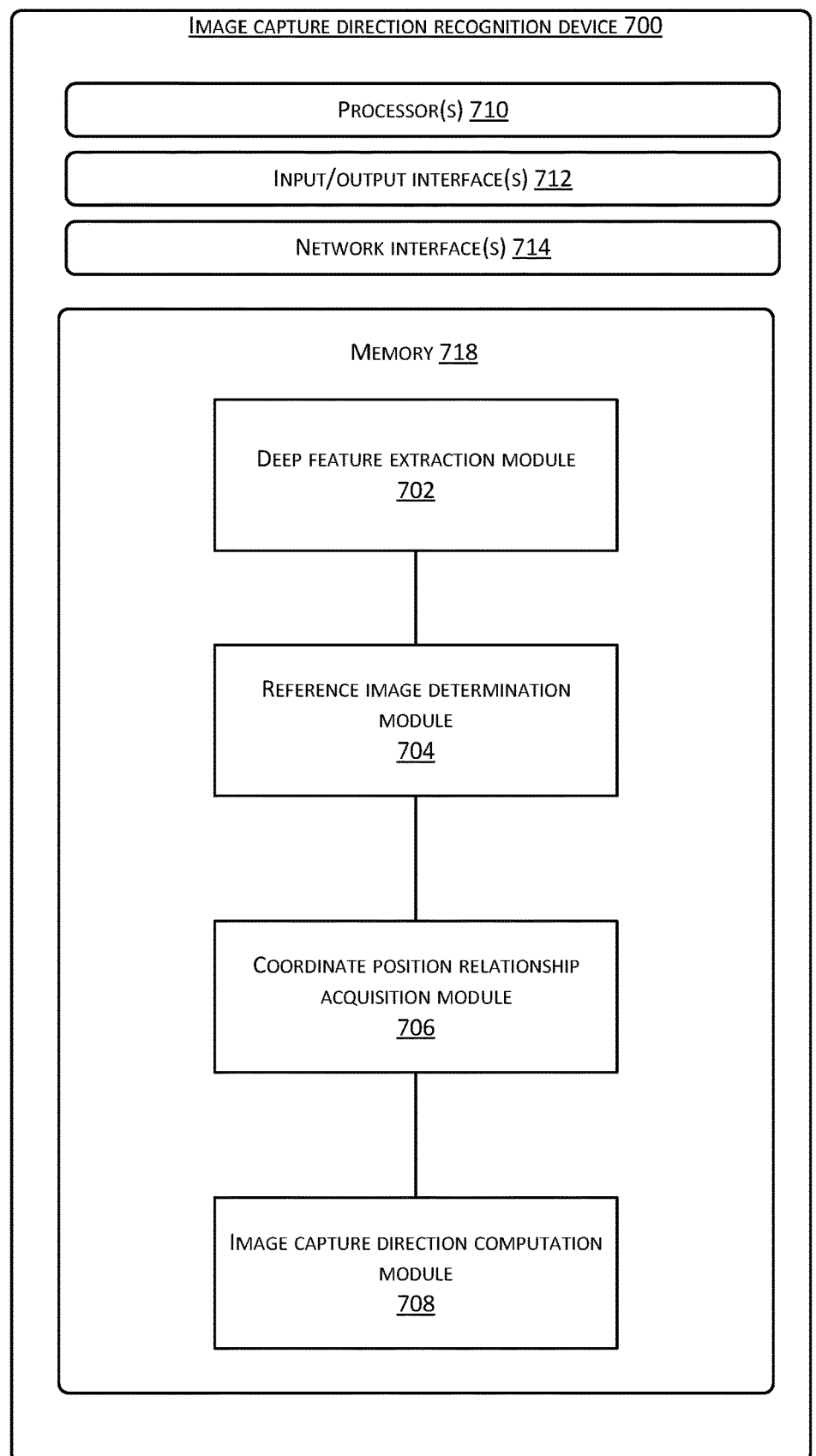
FIG. 7 is a block diagram of an example embodiment of an image capture direction recognition device provided by the present disclosure.

FIG. 7 is a block diagram of an example embodiment of an image capture direction recognition device provided by the present disclosure. In implementations, the image capture direction recognition device may include one or more computing devices. In implementations, the image capture direction recognition device may be a part of one or more computing devices which are located at a single place, or distributed among a plurality of network devices through a network. By way of example and not limitation, according to FIG. 7, the image capture direction recognition device 700 may include: a deep feature extraction module 702, a reference image determination module 704, a coordinate position relationship acquisition module 706, and an image capture direction computation module 708. In particular:

The deep feature extraction module 702 may operate to extract deep features of the target image captured by the camera.

The reference image determination module 704 may operate to determine a matched reference image of the target image, based on degrees of matching between deep features of the target image and deep features of a plurality of reference images;

The coordinate position relationship acquisition module 706 may operate to obtain a coordinate position relationship between the matched reference image and the target image.

The image capture direction computation module 708 may operate to calculate the image capture direction of the camera at the time of capturing the target image, using the coordinate position relationship and the direction information of the matched reference image.

In implementations, the image capture direction recognition device 700 may further include one or more processors 710, an input/output (I/O) interface 712, a network interface 714, and memory 718.

The memory 718 may include a form of computer readable media such as a volatile memory, a random access memory (RAM) and/or a non-volatile memory, for example, a read-only memory (ROM) or a flash RAM. The memory 718 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 718 may include program modules 720 and program data 722. The program modules 720 may include one or more of the modules as describe above.

Another aspect of the present disclosure provides an example embodiment of a surveillance method, which may include:

Acquiring a target image;

Sending the target image to a recognition server, operating the recognition server to recognize the image capture direction of the camera at the time of capturing the target image based on the above-mentioned image capture direction recognition method; and operating the recognition server to perform surveillance processing on an area corresponding to the target image based on the image capture direction.

In the 1990s, technological improvements were clearly differentiated between hardware improvements (for example, improvements to diodes, transistors, switches, etc.) or software improvements (improvements to methods and processes). However, with the development of technology, many improvements to methods and processes can be regarded as direct improvements to hardware circuit structure. Through programming improved methods and processes into hardware circuits, corresponding hardware circuit structure is obtained. Therefore, it cannot be said that an improvement to a method or process cannot be implemented using hardware modules. For example, a Programmable Logic Device (PLD), such as a Field Programmable Gate Array (FPGA), is such an integrated circuit, having logic function determined by a user's programming of the device. A digital system is "integrated" on a PLD, without the need to request the chip manufacturer to design and produce a dedicated integrated circuit chip. Presently, instead of manually manufactured IC chips, such programming is often implemented using "logic compiler" software, which is similar to a software compiler used in program development, and the original code to be compiled must be written in a specific programming language, with Hardware Description Language (HDL) being one example among many, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), and the like; presently, the most commonly used are VHDL (Very-High-Speed Integrated Circuit Hardware Description Language) and Verilog. Persons skilled in the art will appreciate that logic programming in the above hardware description languages may program improvements to methods and processes into an integrated circuit, thus obtaining a hardware circuit that implements the logic of the methods and processes.

A controller may be implemented in any suitable manner. For example, the controller may be in the form of a microprocessor or a processor and a computer readable medium storing computer readable program code (for example, software or firmware) executable by the (micro) processor, a logic gate, a switch, an application-specific integrated circuit (ASIC), a programmable logic controller, or an embedded microcontroller. Examples of controllers include, but are not limited to, the following microcontrollers: ARC 625D, Atmel AT91SAM, Microchip PIC18F26K20, and Silicone Labs C8051F320. A memory controller may also be implemented as a part of control logic of a memory.

Persons skilled in the art will also appreciate that the controller may be implemented by using pure computer readable program code, and in addition, the method steps may be logically programmed to enable the controller to implement the same function in the form of a logic gate, a switch, an ASIC, a programmable logic controller or an embedded microcontroller. Therefore, this type of controller may be regarded as a hardware component, and apparatuses included in the controller for implementing various functions may also be considered as structures within the hardware component. Alternatively, the apparatuses used for implementing various functions may be regarded as both software modules for implementing the method and structures within the hardware component.

The system, apparatus, module or unit illustrated in the above example embodiments may be implemented by using a computer chip or an entity, or a product having a particular function. A typical implementation device may be a computer. In particular, examples of computers may include personal computers, laptops, cellular phones, camera phones, smartphones, personal digital assistants, media players, navigation devices, e-mail devices, game consoles, tablet computers, wearable devices, or a combination of any of the foregoing devices.

For ease of description, when the foregoing apparatus is described, it is divided into various units based on functions for respective descriptions. In implementations of the present disclosure, functions of the units may be implemented in one or in a plurality of software and/or hardware.

Persons skilled in the art will appreciate that embodiments of the invention may be provided as methods, devices, or computer program products. Therefore, the present invention may take the form of fully hardware embodiments, fully software embodiments, or embodiments combining aspects of software and hardware. Furthermore, the invention may take the form of computer program products implemented on one or more computer-readable storage media (including, but not limited to, disk storage, CD-ROM, optical storage, and the like) containing computer-executable program instructions.

The present invention is described by reference to methods, equipment (devices), flowcharts and/or block diagrams of computer program products of embodiments of the invention. It should be appreciated that a computer program instruction may implement each flow and/or block of a flowchart and/or block diagram, or a combination of flows and/or blocks in flowcharts and/or block diagrams. These computer program instructions may be provided to a general-purpose computer, a specialized computer, an embedded processor, or other programmable data processing equipment to produce a machine, where executing an instruction by a processor of a computer or other programmable data processing device produces a device for implementing functions specified in one or more flows of a flowchart and/or one or more blocks of a block diagram.

The computer program instructions may also be stored on a computer or other programmable data processing device, where executing a series of steps on the computer or other programmable data processing device produces a computer-implemented process, where instructions executed on the computer or other programmable data processing device provide steps implementing the functions specified in one or more flows of a flowchart and/or one or more blocks of a block diagram.

In a typical configuration, a computing device includes one or more processors (CPU), an input/output interface, a network interface, and a memory. Memory may include a volatile memory, a random access memory (RAM) and/or a non-volatile memory or the like in a computer-readable medium, for example, a read only memory (ROM) or a flash RAM. The memory is an example of the computer-readable medium. The computer-readable medium includes non-volatile and volatile media as well as movable and non-movable media, and may implement information storage by means of any method or technology. Information may be a computer-readable instruction, a data structure, and a module of a program or other data. An example of the storage medium of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission medium, and may be used to store information accessible by the computing device. According to the definition in this text, the computer-readable medium does not include transitory computer-readable media (transitory media) such as a modulated data signal and carrier.

It should also be noted that the terms "include," "including," or any other variations thereof are intended to cover non-exclusive inclusions, such that the inclusion of a series of elements in a process, method, article, or apparatus includes not only those elements, but also includes other elements not explicitly listed, or include elements that are inherent to such processes, methods, article, or apparatus. Where no further limitation is given, an element defined by the phrase "includes a . . . " does not exclude the existence of another identical element in the process, method, article, or apparatus including the element.

The present disclosure may be described in a common context of a computer executable instruction executed by a computer, for example, a program module. Generally, the program module includes a routine, a program, an object, an assembly, a data structure, and the like used for executing a specific task or implementing a specific abstract data type. The present disclosure may also be practiced in distributed computing environments. In these distributed computing environments, a task is executed by using remote processing devices connected through a communications network. In the distributed computing environments, the program module may be located in local and remote computer storage media including a storage device.

The example embodiments in this specification are described progressively, identical or similar parts of the example embodiments may be obtained with reference to each other, and each example embodiment emphasizes a part different from other example embodiments. Especially, the system example embodiment is basically similar to the method example embodiment and is therefore described simply. For related parts, reference may be made to the descriptions of the parts in the method example embodiment.

Although the present disclosure is described through example embodiments, those of ordinary skill in the art will appreciate that the present disclosure has many variations and changes without departing from the spirit of the present disclosure, and it is expected that the appended claims cover the variations and changes without departing from the spirit of the present disclosure.

The present disclosure may further be understood with clauses as follows.

Clause 1. An image capture direction recognition method, comprising:

extracting deep features of a target image captured by a camera;

determining, based on degrees of matching between the deep features of the target image and deep features of a plurality of reference images, a matched reference image of the target image;

obtaining a coordinate position relationship between the matched reference image and the target image;

calculating, using the coordinate position relationship and direction information of the matched reference image, an image capture direction of the camera at the time of capturing the target image.

Clause 2. The method of clause 1, wherein the plurality of reference images comprises:

a predetermined plurality of reference images having direction and/or time features.

Clause 3. The method of clause 2, wherein the plurality of reference images having direction and/or time features is determined by steps comprising:

selecting a plurality of feature images having direction and/or time features from historical sample images;

performing cluster analysis on deep features of the historical sample images with respective deep features of the plurality of feature images designated as cluster centers, assigning the historical sample images to a plurality of clusters corresponding to the cluster centers;

determining an image from each cluster as a reference image having corresponding direction and/or time features.

Clause 4. The method of clause 3, wherein determining an image from each cluster as a reference image having corresponding direction and/or time features comprises:

performing a respective mean calculation on deep features of images of each cluster, designating a calculated mean as a respective new cluster center; and performing iterative cluster analysis on deep features of the historical sample images based on a plurality of new cluster centers until reaching a preset convergence condition, designating the images corresponding to the cluster centers upon reaching the preset convergence condition as reference images;

wherein the preset convergence condition comprises a degree of difference between deep features of historical sample images of each cluster and the respective corresponding cluster center of the cluster being less than or equal to a preset degree of difference value.

Clause 5. The method of clause 3, wherein determining an image from each cluster as a reference image having corresponding direction and/or time features comprises:

calculating respective degrees of difference between deep features of images of each cluster;

selecting from each cluster the image having a smallest sum of degrees of difference with deep features of other images of the same cluster as a reference image.

Clause 6. A method of clauses 1 to 5, wherein determining, based on degree of matching between the deep features of the target image and deep features of a plurality of reference images, a matched reference image of the target image comprises:

calculating respective degrees of matching between deep features of the target image and of the plurality of reference images;

designating the reference image corresponding to the deep features with the greatest degree of matching as the reference image matching the target image.

Clause 7. The method of clause 6, wherein the degree of matching comprises one of:
Euclidean distance;
cosine distance; and
Manhattan distance.

Clause 8. A method of clauses 1 to 5, wherein obtaining a coordinate position relationship between the matched reference image and the target image comprises:

extracting point features of the matched reference image and the target image;

performing point matching between feature points of the matched reference image and feature points of the target image;

calculating a coordinate position relationship between the matched point pairs, obtaining a homography transformation matrix between the matched reference image and the target image, and designating a conversion relationship of the homography transformation matrix as the coordinate position relationship.

Clause 9. A method of clauses 1 to 5, wherein direction information comprises:

pan, tilt, and zoom data of the camera at the time of capturing an image.

Clause 10. A method of clauses 1 to 5, wherein calculating an image capture direction of the camera at the time of capturing the target image comprises:

performing displacement processing on direction information of the matched reference image, based on displacement parameters determined from the coordinate position relationship, to obtain the image capture direction.

Clause 11. A surveillance method, comprising:
acquiring a target image; and
sending the target image to a recognition server, operating the recognition server to, based on a method of clauses 1 to 10, recognize the image capture direction of the camera at the time of capturing the target image; and operating the recognition server to perform surveillance processing on an area corresponding to the target image based on the image capture direction.

Clause 12. An image capture direction recognition server, comprising a processor and a memory, the memory storing computer program instructions executable by the processor to:

extract deep features of a target image captured by a camera;

determine a matched reference image of the target image based on degrees of matching between deep features of the target image and deep features of a plurality of reference images;

obtain a coordinate position relationship between the matched reference image and the target image;

calculate the image capture direction of the camera at the time of capturing the target image using the coordinate position relationship and direction information of the matched reference image.

Clause 13. The server of clause 12, wherein the plurality of reference images comprises:

a predetermined plurality of reference images having direction and/or time features.

Clause 14. The server of clause 13, wherein the plurality of reference images having direction and/or time features is determined by steps comprising:

selecting a plurality of feature images having direction and/or time features from historical sample images;

performing cluster analysis on deep features of the historical sample images with respective deep features of the plurality of feature images designated as cluster centers, assigning the historical sample images to a plurality of clusters corresponding to the cluster centers;

determining an image from each cluster as a reference image having corresponding direction and/or time features.

Clause 15. The server of claim 14, wherein determining an image from each cluster as a reference image having corresponding direction and/or time features comprises:

performing a respective mean calculation on deep features of images of each cluster, designating a calculated mean as a respective new cluster center; and performing iterative cluster analysis on deep features of the historical sample images based on a plurality of new cluster centers until reaching a preset convergence condition, designating the images corresponding to the cluster centers upon reaching the preset convergence condition as reference images;

wherein the preset convergence condition comprises a degree of difference between deep features of historical sample images of each cluster and the respective corresponding cluster center of the cluster being less than or equal to a preset degree of difference value.

Clause 16. The server of clause 14, wherein determining an image from each cluster as a reference image having corresponding direction and/or time features comprises:

calculating respective degrees of difference between deep features of images of each cluster;

selecting from each cluster the image having a smallest sum of degrees of difference from deep features of other images of the same cluster as a reference image.

Clause 17. A server of clauses 12 to 16, wherein determining, based on degree of matching between the deep features of the target image and deep features of a plurality of reference images, a matched reference image of the target image comprises:

calculating respective degrees of matching between deep features of the target image and of the plurality of reference images;

designating the reference image corresponding to the deep features with the greatest degree of matching as the reference image matching the target image.

Clause 18. The server of clause 17, wherein the degree of matching comprises one of:
- Euclidean distance;
- cosine distance; and
- Manhattan distance.

Clause 19. A server of clauses 12 to 16, wherein obtaining a coordinate position relationship between the matched reference image and the target image comprises:
extracting point features of the matched reference image and the target image;
performing point matching between feature points of the matched reference image and feature points of the target image;
calculating a coordinate position relationship between the matched point pairs, obtaining a homography transformation matrix between the matched reference image and the target image, and designating a conversion relationship of the homography transformation matrix as the coordinate position relationship.

Clause 20. A server of clauses 12 to 16, wherein direction information comprises:
pan, tilt, and zoom data of the camera at the time of capturing an image.

Clause 21. A method of clauses 12 to 16, wherein calculating an image capture direction of the camera at the time of capturing the target image comprises:
performing displacement processing on direction information of the matched reference image, based on displacement parameters determined from the coordinate position relationship, to obtain the image capture direction.

Clause 22. An image capture direction recognition device, comprising:
a deep feature extraction module operable to extract deep features of a target image captured by a camera;
a reference image determination module operable to determine a matched reference image of the target image, based on degrees of matching between deep features of the target image and deep features of a plurality of reference images;
a coordinate position relationship acquisition module operable to obtain a coordinate position relationship between the matched reference image and the target image;
an image capture direction computation module operable to calculate an image capture direction of the camera at the time of capturing the target image, using the coordinate position relationship and direction information of the matched reference image.

Clause 23. A surveillance system, comprising:
an acquisition unit operable to acquire a target image and to send target images to a recognition server;
a recognition server operable according to a method of clauses 1 to 10 to recognize the image capture direction of a camera at the time of capturing a target image, and operable to perform surveillance processing on an area corresponding to the target image using the image capture direction.

Clause 24. A surveillance system, comprising:
an acquisition unit operable to acquire a target image and to send target images to a recognition server;
a recognition server operable according to a method of clauses 1 to 10 to recognize the image capture direction of a camera at the time of capturing a target image, and operable to send the image capture direction to a surveillance server;
a surveillance server operable to perform surveillance processing on an area corresponding to the target image using the image capture direction of the recognition server.

Clause 25. An image capture device, comprising:
a lens operable to capture a target image;
a processor connected to the lens operable to determine the direction of the lens at the time of capturing the target image according to a method of clauses 1 to 10.

Clause 26. The image capture device clause 25, the image capture device comprising one of:
a mobile device;
a security camera;
an aerial surveillance device; and
a mobile ground surveillance device.

Clause 27. A computer-readable medium, the computer-readable medium storing computer program instructions executable by a processor to implement steps of a method of clauses 1 to 10.

What is claimed is:

1. A method comprising:
extracting deep features of a target image captured by a camera;
determining, based on degrees of matching between the deep features of the target image and deep features of a plurality of reference images, a matched reference image of the target image;
obtaining a coordinate position relationship between the matched reference image and the target image; and
calculating, using the coordinate position relationship and direction information of the matched reference image, an image capture direction of the camera at the time of capturing the target image;
wherein determining, based on degree of matching between the deep features of the target image and deep features of a plurality of reference images, a matched reference image of the target image comprises:
calculating respective degrees of matching between deep features of the target image and of the plurality of reference images; and
designating the reference image corresponding to the deep features with the greatest degree of matching as the reference image matching the target image.

2. The method of claim 1, wherein the plurality of reference images comprises:
a predetermined plurality of reference images having at least one of direction features and time features.

3. The method of claim 2, wherein the plurality of reference images having at least one of direction and time features is determined by steps comprising:
selecting a plurality of feature images having at least one of direction features and time features from historical sample images;
performing cluster analysis on deep features of the historical sample images with respective deep features of the plurality of feature images designated as cluster centers, assigning the historical sample images to a plurality of clusters corresponding to the cluster centers;
determining an image from each cluster as a reference image having corresponding at least one of direction features and time features.

4. The method of claim 3, wherein determining an image from each cluster as a reference image having corresponding at least one of direction features and time features comprises:

performing a respective mean calculation on deep features of images of each cluster, designating a calculated mean as a respective new cluster center; and performing iterative cluster analysis on deep features of the historical sample images based on a plurality of new cluster centers until reaching a preset convergence condition, designating the images corresponding to the cluster centers upon reaching the preset convergence condition as reference images;

wherein the preset convergence condition comprises a degree of difference between deep features of historical sample images of each cluster and the respective corresponding cluster center of the cluster being less than or equal to a preset degree of difference value.

5. The method of claim 3, wherein determining an image from each cluster as a reference image having corresponding at least one of direction features and time features comprises:

calculating respective degrees of difference between deep features of images of each cluster;

selecting from each cluster the image having a smallest sum of degrees of difference from deep features of other images of the same cluster as a reference image.

6. The method of claim 1, wherein the degree of matching comprises one of:

Euclidean distance;
cosine distance; and
Manhattan distance.

7. The method of claim 1, wherein obtaining a coordinate position relationship between the matched reference image and the target image comprises:

extracting point features of the matched reference image and the target image;

performing point matching between feature points of the matched reference image and feature points of the target image;

calculating a coordinate position relationship between the matched point pairs, obtaining a homography transformation matrix between the matched reference image and the target image, and designating a conversion relationship of the homography transformation matrix as the coordinate position relationship.

8. The method of claim 1, wherein direction information comprises:

pan, tilt, and zoom data of the camera at the time of capturing an image.

9. The method of claim 1, wherein calculating an image capture direction of the camera at the time of capturing the target image comprises:

performing displacement processing on direction information of the matched reference image, based on displacement parameters determined from the coordinate position relationship, to obtain the image capture direction.

10. A server, comprising a processor and a memory, the memory storing computer program instructions executable by the processor to:

extract deep features of a target image captured by a camera;

determine a matched reference image of the target image based on degrees of matching between deep features of the target image and deep features of a plurality of reference images;

obtain a coordinate position relationship between the matched reference image and the target image; and calculate the image capture direction of the camera at the time of capturing the target image using the coordinate position relationship and direction information of the matched reference image;

wherein determining, based on degree of matching between the deep features of the target image and deep features of a plurality of reference images, a matched reference image of the target image comprises:

calculating respective degrees of matching between deep features of the target image and of the plurality of reference images;

designating the reference image corresponding to the deep features with the greatest degree of matching as the reference image matching the target image.

11. The server of claim 10, wherein the plurality of reference images comprises:

a predetermined plurality of reference images having at least one of direction features and time features.

12. The server of claim 11, wherein the plurality of reference images having at least one of direction features and time features is determined by steps comprising:

selecting a plurality of feature images having at least one of direction features and time features from historical sample images;

performing cluster analysis on deep features of the historical sample images with respective deep features of the plurality of feature images designated as cluster centers, assigning the historical sample images to a plurality of clusters corresponding to the cluster centers;

determining an image from each cluster as a reference image having corresponding at least one of direction features and time features.

13. The server of claim 12, wherein determining an image from each cluster as a reference image having corresponding at least one of direction features and time features comprises:

performing a respective mean calculation on deep features of images of each cluster, designating a calculated mean as a respective new cluster center; and performing iterative cluster analysis on deep features of the historical sample images based on a plurality of new cluster centers until reaching a preset convergence condition, designating the images corresponding to the cluster centers upon reaching the preset convergence condition as reference images;

wherein the preset convergence condition comprises a degree of difference between deep features of historical sample images of each cluster and the respective corresponding cluster center of the cluster being less than or equal to a preset degree of difference value.

14. The server of claim 12, wherein determining an image from each cluster as a reference image having corresponding at least one of direction features and time features comprises:

calculating respective degrees of difference between deep features of images of each cluster;

selecting from each cluster the image having a smallest sum of degrees of difference from deep features of other images of the same cluster as a reference image.

15. The server of claim 10, wherein obtaining a coordinate position relationship between the matched reference image and the target image comprises:

extracting point features of the matched reference image and the target image;

performing point matching between feature points of the matched reference image and feature points of the target image;

calculating a coordinate position relationship between the matched point pairs, obtaining a homography transformation matrix between the matched reference image and the target image, and designating a conversion relationship of the homography transformation matrix as the coordinate position relationship.

16. The server of claim 10, wherein direction information comprises:

pan, tilt, and zoom data of the camera at the time of capturing an image.

17. The server of claim 10, wherein calculating an image capture direction of the camera at the time of capturing the target image comprises:

performing displacement processing on direction information of the matched reference image, based on displacement parameters determined from the coordinate position relationship, to obtain the image capture direction.

18. A device comprising:

a deep feature extraction module operable to extract deep features of a target image captured by a camera;

a reference image determination module operable to determine a matched reference image of the target image, based on degrees of matching between deep features of the target image and deep features of a plurality of reference images;

a coordinate position relationship acquisition module operable to obtain a coordinate position relationship between the matched reference image and the target image; and an image capture direction computation module operable to calculate an image capture direction of the camera at the time of capturing the target image, using the coordinate position relationship and direction information of the matched reference image;

wherein the reference image determination module is operable to determine, based on degree of matching between the deep features of the target image and deep features of a plurality of reference images, a matched reference image of the target image by:

calculating respective degrees of matching between deep features of the target image and of the plurality of reference images; and designating the reference image corresponding to the deep features with the greatest degree of matching as the reference image matching the target image.

* * * * *